March 1, 1927.
W. D. HUGHES
FRUIT PICKER
Filed June 18, 1924
1,619,731
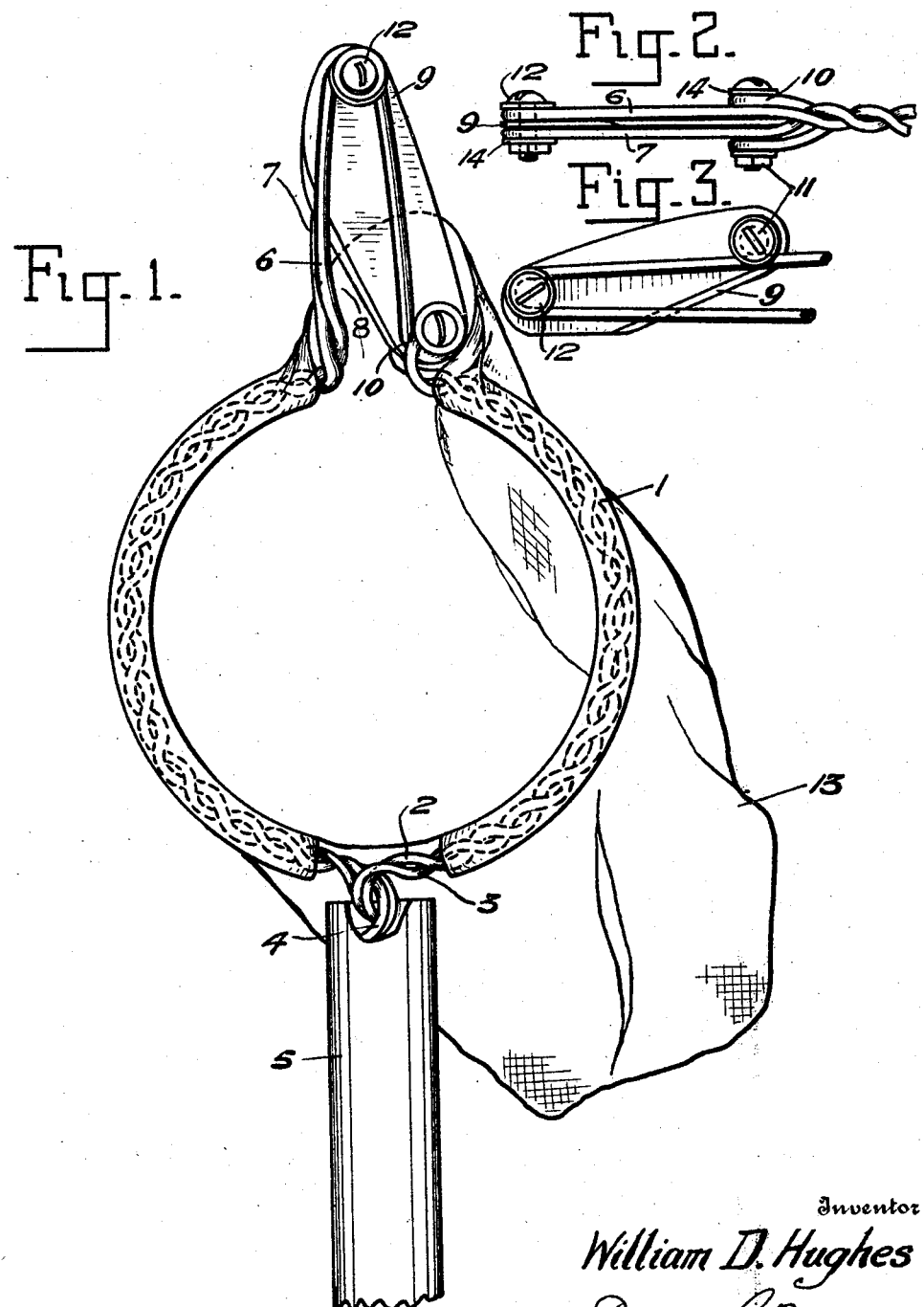
Inventor
William D. Hughes
By
Attorney Patented Mar. 1, 1927.

1,619,731

UNITED STATES PATENT OFFICE.

WILLIAM D. HUGHES, OF MIAMI, FLORIDA.

FRUIT PICKER.

Application filed June 18, 1924. Serial No. 720,823.

This invention relates to fruit pickers and proposes the construction of a device of the character designated by means of which fruit may be picked from the tree without the necessity of the operator leaving the ground.

One of the objects of the invention is the provision of a bag supporting frame, and a knife secured in association therewith so as to be supported on both sides by said frame, thus relieving the securing means of all strain incident to the use of the knife.

Another object of the invention is the construction of the knife holding frame from wire or other bendable material having superposed loops of similar size and shape for the guidance of the fruit stem, between which loops the knife is frictionally held, said loops being bent into aligned rings one on each loop, through which the knife securing means is passed.

Still another object of the invention resides in the novel means herein described for securing the knife to the frame in such manner as to adapt it not only to use as a fruit picker but as a tree pruner as well.

A further object of the invention resides in the construction of an improved fruit picker along the lines of the specific features hereinafter disclosed, or their equivalents, whereby an article is produced characterized by lightness, durability, efficiency and cheapness of manufacture.

Additional objects of the invention will appear in the following specification in which the preferred form of my invention is disclosed.

In the drawing similar reference characters refer to similar parts in all the views in which:—

Figure 1 is a plan view of my improved fruit picker.

Figure 2 is a side view of the knife holding means.

Figure 3 is a plan view of the device shown in Figure 2.

Referring now in detail to the several figures, the numeral 1 represents the frame of the fruit picker which is here shown as being constructed of a pair of wires 2 and 3 twisted together and formed into a ring. The size of the ring is immaterial to the invention, but in practice it should be made sufficiently large to readily surround a cluster of fruit such as apples. The free ends of the wires are twisted together, as shown at 4, and secured in any suitable manner to a handle or pole 5. The wires 2 and 3 at that part of the frame which lies opposite the handle are extended outwardly into narrow superposed loops 6 and 7 of similar shape and size which normally contact forming a stem-guiding channel 8. A knife 9 is slipped between the loops 6 and 7, being frictionally engageable therewith. Each of said loops is bent to form a ring 10, said rings being in alignment with an aperture in one end of the knife 9. A bolt and nut 11, or other equivalent securing means is passed through said rings, the washers 14, intervening and affording a bearing surface for said securing means against said rings. Similar securing means 12 engage the outer ends of the loops 6 and 7 holding said loops clamped against the knife 9. Said knife is provided with an inclined cutting edge for imparting a draw cut in the act of severing the fruit stem.

The frame 1 is here shown as supporting the mouth of a fabric bag 13 although it is to be understood that a wire or other basket may be substituted therefor and still be within the spirit of the invention.

As the invention does not primarily concern itself with the circular shape of the frame 1, but more particularly with the knife securing means therefor, it is well within the scope of the invention to apply it to use as a tree pruner without reference to any form of fruit container whatsoever.

Obviously, changes in the details of construction may be made, without departing from the spirit of the invention and I do not wish to limit myself to any particular form or arrangement of parts.

Having described my invention what I claim as new and desire to secure by Letters Patent, is:—

A fruit picker including a frame formed with a stem guiding channel comprising a pair of superposed wire loops of generally similar shape, a knife frictionally supported between said loops, the latter having coiled portions forming aligned rings, and securing means for said knife passing through said rings.

In testimony whereof I have hereunto set my hand.

WILLIAM D. HUGHES.